US012386903B2

(12) United States Patent
Jeong et al.

(10) Patent No.: US 12,386,903 B2
(45) Date of Patent: Aug. 12, 2025

(54) METHOD AND SYSTEM FOR PROVIDING CONTENTS

(71) Applicant: NAVER WEBTOON LTD., Seongnam-si (KR)

(72) Inventors: Jae Seon Jeong, Seongnam-si (KR); Mi Ae Lee, Seongnam-si (KR); Ji Hyun Kim, Seongnam-si (KR); Sung Bae Yoon, Seongnam-si (KR); Jung Hwan Ahn, Seongnam-si (KR); Seung Beom Han, Seongnam-si (KR); Oh Seon Gwon, Seongnam-si (KR); Soon Hyong Lee, Seongnam-si (KR); Tae Hun Kim, Seongnam-si (KR)

(73) Assignee: NAVER WEBTOON LTD., Seongnam-si (KR)

( * ) Notice: Subject to any disclaimer, the term of this patent is extended or adjusted under 35 U.S.C. 154(b) by 0 days.

(21) Appl. No.: 18/394,026

(22) Filed: Dec. 22, 2023

(65) Prior Publication Data
US 2024/0220545 A1    Jul. 4, 2024

(30) Foreign Application Priority Data

Dec. 29, 2022  (KR) .................. 10-2022-0189336

(51) Int. Cl.
*G06F 16/00* (2019.01)
*G06F 16/9035* (2019.01)
(Continued)

(52) U.S. Cl.
CPC ........ *G06F 16/9035* (2019.01); *G06F 16/904* (2019.01); *G06F 16/908* (2019.01)

(58) Field of Classification Search
CPC ... G06F 16/9035; G06F 16/9535; G06F 9/542
See application file for complete search history.

(56) References Cited

U.S. PATENT DOCUMENTS

| 9,591,050 B1* | 3/2017 | Sherrets ........... H04N 21/44226 |
| 2007/0147178 A1* | 6/2007 | Masuda ................ G06F 3/0481 |
| | | 368/29 |

(Continued)

FOREIGN PATENT DOCUMENTS

| JP | 2014052719 A | 3/2014 |
| JP | 2016071741 A | 5/2016 |

(Continued)

OTHER PUBLICATIONS

Nakamura et al.,"Calendar for everything: Browse and Search for Personal Archive on Calendar",2008,IEEE,pp. 191-195 (Year: 2008).*

(Continued)

*Primary Examiner* — Alexander Khong
(74) *Attorney, Agent, or Firm* — Greer Burns & Crain Ltd.

(57) ABSTRACT

A method of providing contents according to the present invention may include receiving, from a user terminal, a request to output a specific page corresponding to a specific day of the week among a plurality of pages distinguished on the basis of the day of the week; identifying a specific user account logged in to the user terminal, and identifying a recommended content that is recommended for the specific user account among a plurality of contents provided on the specific day of the week; and providing, to the user terminal, at least some of the plurality of contents being serialized on that specific day of the week and the specific page in which a plurality of thumbnails corresponding to each of the plurality of contents are listed according to predetermined sorting criteria. A specific thumbnail corresponding to the recommended content among the plurality of thumbnails may include a recommendation indicator.

17 Claims, 10 Drawing Sheets

(51) Int. Cl.
*G06F 16/904* (2019.01)
*G06F 16/908* (2019.01)

(56) References Cited

U.S. PATENT DOCUMENTS

| | | | | |
|---|---|---|---|---|
| 2008/0256450 A1* | 10/2008 | Takakura | ............... | G06T 11/60 715/721 |
| 2010/0192064 A1* | 7/2010 | Beppu | ............... | G06Q 30/02 715/710 |
| 2010/0192176 A1* | 7/2010 | Beppu | ............... | A63F 13/12 725/32 |
| 2015/0325133 A1* | 11/2015 | Gaglani | ............... | G09B 7/00 434/322 |
| 2016/0103561 A1* | 4/2016 | Lee | ............... | G06F 3/0482 715/716 |
| 2020/0363944 A1* | 11/2020 | Kim | ............... | G06F 3/0482 |
| 2022/0198779 A1* | 6/2022 | Saraee | ............... | G06F 16/9535 |

FOREIGN PATENT DOCUMENTS

| | | |
|---|---|---|
| JP | 2021002261 A | 1/2021 |
| KR | 1020150020390 A | 2/2015 |
| WO | 2017126494 A1 | 7/2017 |

OTHER PUBLICATIONS

Office action issued in corresponding JP application No. 2023-133010, dated Jun. 11, 2024.
"Shonen jumping +": Nikkei cross trend, [online], Nikkei BP (Aug. 11, 2022); The Wayback Machine—https://web.archive.org/web/20220811090927/https://xtrend.nikkei.com/atcl/contents/18/00645/00001/?SS=imgvie . . . .
Naver Webtoon home screen reorganization (Aug. 18, 2022); https://n.news.naver.com/mnews/article/029/0002749567?sid=105.
Notice of Allowance issued in corresponding Japanese application No. 2023-133010, dated Nov. 5, 2024.

* cited by examiner

FIG. 1
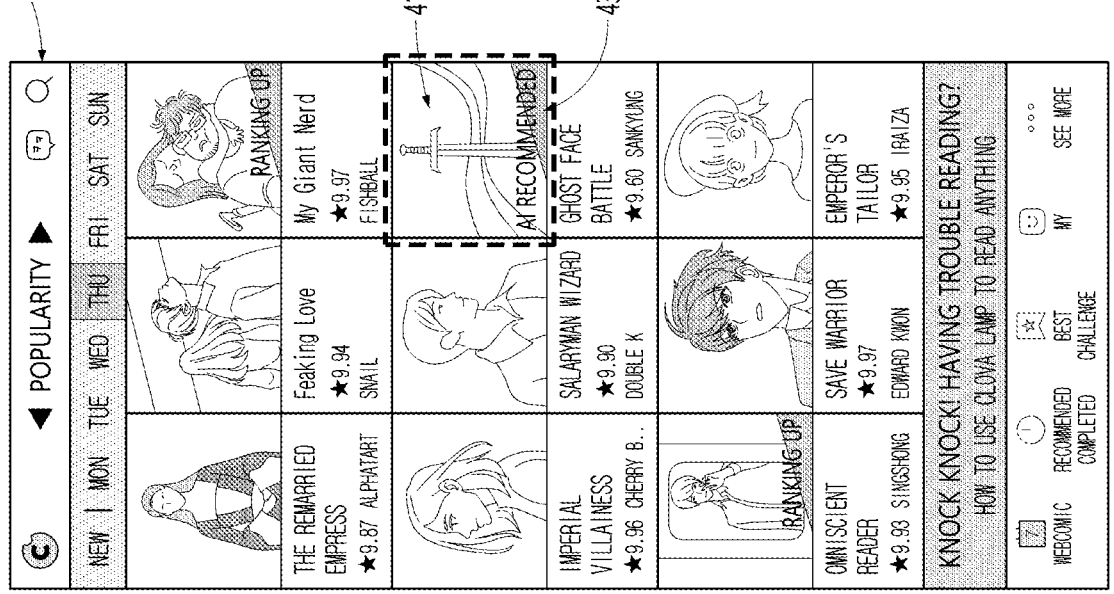
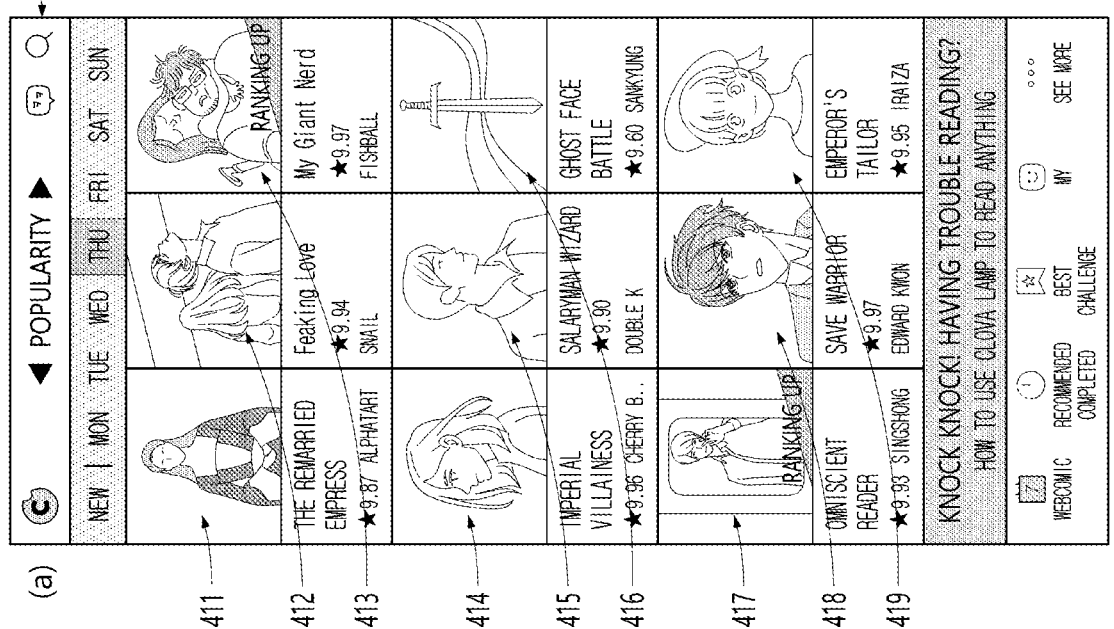

FIG. 5

| THURSDAY | |
|---|---|
| 511 → | THE REMARRIED EMPRESS |
| 512 → | Feaking Love |
| 513 → | My Giant Nerd |
| 514 → | IMPERIAL VILLAINESS |
| 515 → | SALARYMAN WIZARD |
| 516 → | GHOST FACE BATTLE |
| 517 → | OMNISCIENT READER |
| 518 → | SAVE WARRIOR |
| 519 → | EMPEROR'S TAILOR |

(a)

510

| FRIDAY | |
|---|---|
| LORD OF ICE CASTLE | ← 521 |
| True Beauty | ← 522 |
| YONA OF THE DAWNDIARY | ← 523 |
| YUMI'S DIARY | ← 524 |
| Behind the GIFs | ← 525 |
| RETURN OF THE GENIUS DOCTOR | ← 526 |
| MONEY GAME | ← 527 |
| THE GREATEST DESIGN | ← 528 |
| UNKNOWN RELATIONSHIP | ← 529 |

(b)

520

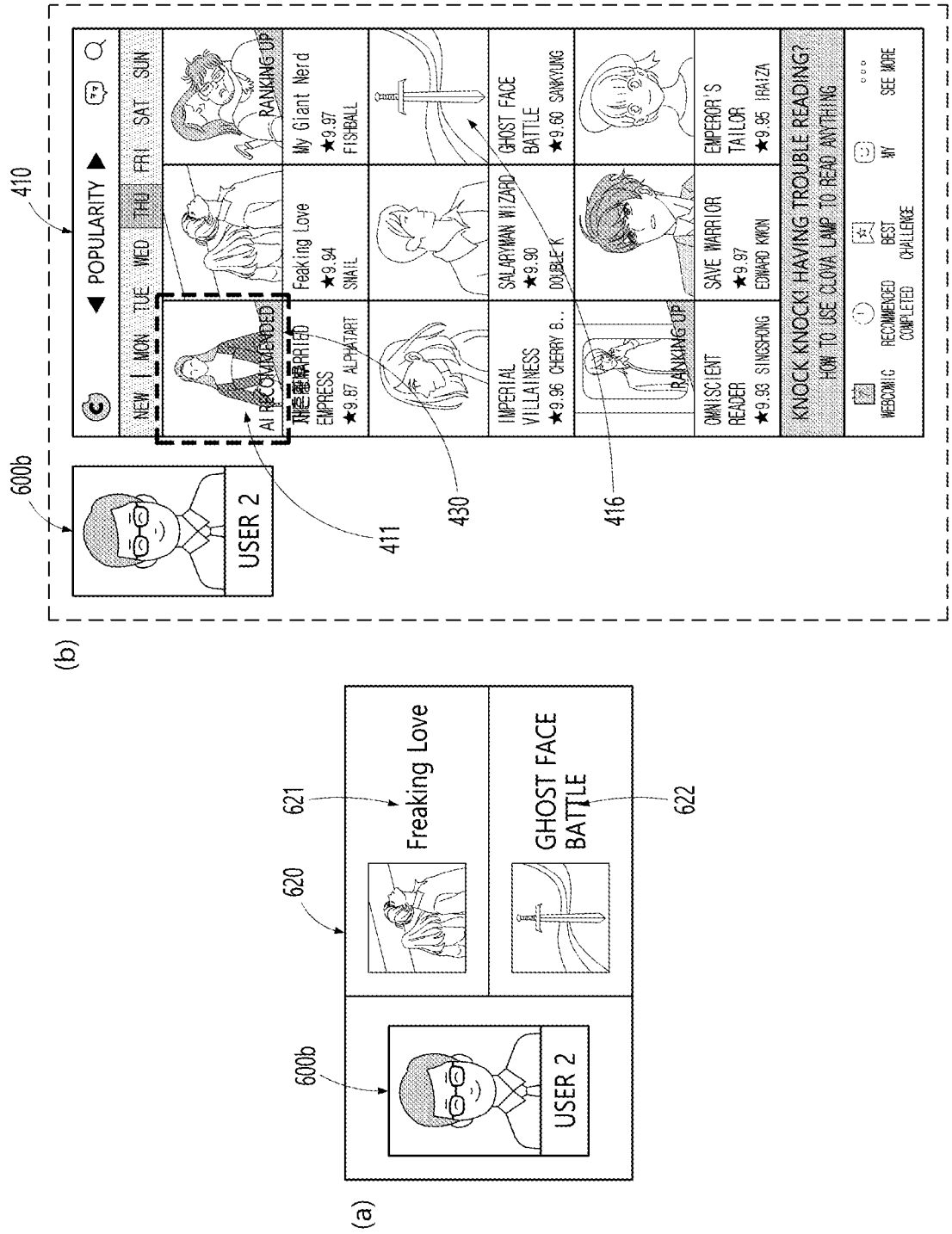

FIG. 7

● EXCLUDED RECOMMENDATIONS (SAME AS BEFORE)

700

| | ITEMS | DETAIL CRITERIA | REFLECTION CYCLES | REMARKS | REMARKS 2 |
|---|---|---|---|---|---|
| 710 | 1. ALREADY VIEWED (PERSONALIZATION) | 3 OR MORE VIEWER ENTRIES IN LAST 6 MONTHS | REAL-TIME | WORK WITH 1 TO 2 VIEWER ENTRIES IN LAST 6 MONTHS ARE ABLE TO INCLUDE RECOMMENDATION RESULTS | PLATFORM COMMON |
| 720 | 2. WEBCOMICS OF INTEREST (PERSONALIZATION) | USER'S SAVED WEBCOMICS OF INTEREST | | UPDATE ON DAILY BASIS | |
| 730 | 3. USER REJECTED RECOMMENDATIONS (PERSONALIZATION) | CONTEXT MENU SELECT "NOT MY FAVORITE" | REAL-TIME | MOBILE WEB HOME CUVE STREAM LINKAGE | MW DATA |
| 740 | 4. BRAND WEBCOMICS | COM_WORK META DB_THEME | | — | |
| 750 | 5. PUBLIC ENTITY WEBCOMICS | COM_WORK META DB_THEME | | — | |
| 760 | 6. ADULT WEBCOMICS | COM_WORK META DB_ADULT | | FILTERING ONLY FOR NON-LOGGED-IN /AGE-RESTRICTED USERS | POSSIBLE EXPOSURE TO ADULT USERS |
| 770 | 7. BLACKLIST WEBCOMICS | COM_CARTOON MANAGEMENT _BLACKLIST MANAGEMENT | REAL-TIME | AIRS NEEDS TO BE REFLECTED IN REAL-TIME WHEN REFLECTING ADMIN TOOLS | |
| 780 | 8. SERVICE PENDING /TERMINATION | COM_WORK META DB _SERVICE STATE | | SERVICE STATE - ONLY AVAILABLE WHEN PUBLISHED (PROVISION CONDITION) | |
| 790 | 9. LONG-TERM DORMANCY | COM_WORK META DB _DORMANCY/COMPLETION SIMULTANEOUS CHECK | | PROCESSING (IN OPERATION) COMPLETION/DORMANCY IN CASE OF WORK NOT SCHEDULED TO RETURN | |

METHOD AND SYSTEM FOR PROVIDING CONTENTS

CROSS REFERENCE TO RELATED APPLICATION

The present application claims priority to Korean Patent Application No. 10-2022-0189336, filed on Dec. 29, 2022, the entire contents of which are incorporated herein for all purposes by reference.

BACKGROUND OF THE INVENTION

Field of the Invention

The present invention relates to a method and a system for providing contents. More particularly, the present invention relates to a method and a system for providing contents that are capable of providing customized recommended contents for each user when providing information on contents depending on a ranking on the basis of a day of the week in which the contents are serialized.

Description of the Related Art

As technology advances, the use of a digital device increases. In particular, a user terminal (e.g., smartphone, tablet PC, etc.) is equipped with various functions including communication functions such as making phone calls or texting messages, as well as surfing the web, listening to music, and watching videos using the Internet.

With the popularization of the user terminal, consumption of contents provided through the user terminal such as PC or mobile devices is rapidly increasing. As an example, there is webcomics.

As the consumption of these webcomics continues to increase, various service providers (or webcomic-related service providers) develop various services to secure users (or consumers, subscribers) who can use the services steadily.

Meanwhile, in order to ensure continuous consumption of contents such as webcomics, content providing services serialize contents in various ways. For example, by serializing specific contents on a specific day of the week, users are encouraged to visit every specific day of the week to use the users' favorite contents.

SUMMARY OF THE INVENTION

The present invention relates to a method and a system for providing contents that are capable of more effectively providing users with information on contents.

More particularly, the present invention relates to a method and a system for providing contents that are capable of providing customized recommended contents for each user when providing information on contents depending on a ranking on the basis of a day of the week in which the contents are serialized.

Further, the present invention relates to a method and a system for providing contents that provide a user environment in which users can intuitively recognize recommended contents.

To achieve the above-mentioned objects, there is provided a method of providing contents according to the present invention. The method may include: receiving, from a user terminal, a request to output a specific page corresponding to a specific serialized day of the week among a plurality of pages distinguished on the basis of a serialized day of the week; identifying a specific user account logged in to the user terminal, and identifying a recommended content that is recommended for the specific user account among a plurality of contents provided on the specific serialized day of the week; and providing at least some of the plurality of contents being serialized on that specific serialized day of the week and the specific page in which a plurality of thumbnails corresponding to each of the recommended contents are listed, with the user terminal, according to predetermined sorting criteria, in which a specific thumbnail corresponding to the recommended content among the plurality of thumbnails may include a recommendation indicator.

Further, there is provided a system for providing contents according to the present invention, the system may include: a communication unit configured to receive, from a user terminal, a request to output a specific page corresponding to a specific serialized day of the week among a plurality of pages distinguished on the basis of a serialized day of the week; and control unit configured to identify a specific user account logged in to the user terminal, and identify a recommended content that is recommended for the specific user account among a plurality of contents provided on the specific serialized day of the week, in which the control unit may provide at least some of the plurality of contents being serialized on that specific serialized day of the week and the specific page in which a plurality of thumbnails corresponding to each of the recommended contents are listed, with the user terminal, according to predetermined sorting criteria, and in which a specific thumbnail corresponding to the recommended content among the plurality of thumbnails may include a recommendation indicator.

Further, there is provided a program according to the present invention that is executed by one or more processes on an electronic device and stored on a computer-readable recording medium, the program may include: receiving, from a user terminal, a request to output a specific page corresponding to a specific serialized day of the week among a plurality of pages distinguished on the basis of a serialized day of the week; identifying a specific user account logged in to the user terminal, and identifying a recommended content that is recommended for the specific user account among a plurality of contents provided on the specific serialized day of the week; and providing at least some of the plurality of contents being serialized on that specific serialized day of the week and the specific page in which a plurality of thumbnails corresponding to each of the recommended contents are listed, with the user terminal, according to predetermined sorting criteria, in which the program may include instructions that perform to allow a specific thumbnail corresponding to the recommended content among the plurality of thumbnails to include a recommendation indicator.

As described above, the method and a system for providing contents according to the present invention provide an intuitive user environment that enables users to identify at a glance information on contents that are serialized on each day of the week by collecting and providing information on contents that are serialized on the basis of day of the week on a specific service page.

Further, the method and a system for providing contents according to the present invention may provide information on popular contents to the users by providing contents that are serialized on a specific serialized day of the week according to ranking.

Further, in the method and system of providing contents according to the present invention, the user may be provided with information on user-customized recommended contents together with information on popular contents by overlapping a recommendation indicator on a thumbnail corresponding to a recommended content selected based on user information of a specific user account.

Further, the method and a system for providing contents according to the present invention may encourage the user to use contents by recommending contents that are expected to be preferred by the user.

BRIEF DESCRIPTION OF THE DRAWINGS

FIG. 1 is a conceptual illustration describing a method of providing user-customized recommended contents according to the present invention.

FIGS. 4 and 5 are conceptual illustrations for describing a method of providing recommended contents on the basis of serialized days of the week.

FIGS. 6A and 6B are conceptual illustrations for describing a method for providing recommended contents on the basis of user information.

FIG. 7 is a diagram for describing a method of providing recommended content based on user information.

DETAILED DESCRIPTION OF THE INVENTION

Figure 2:
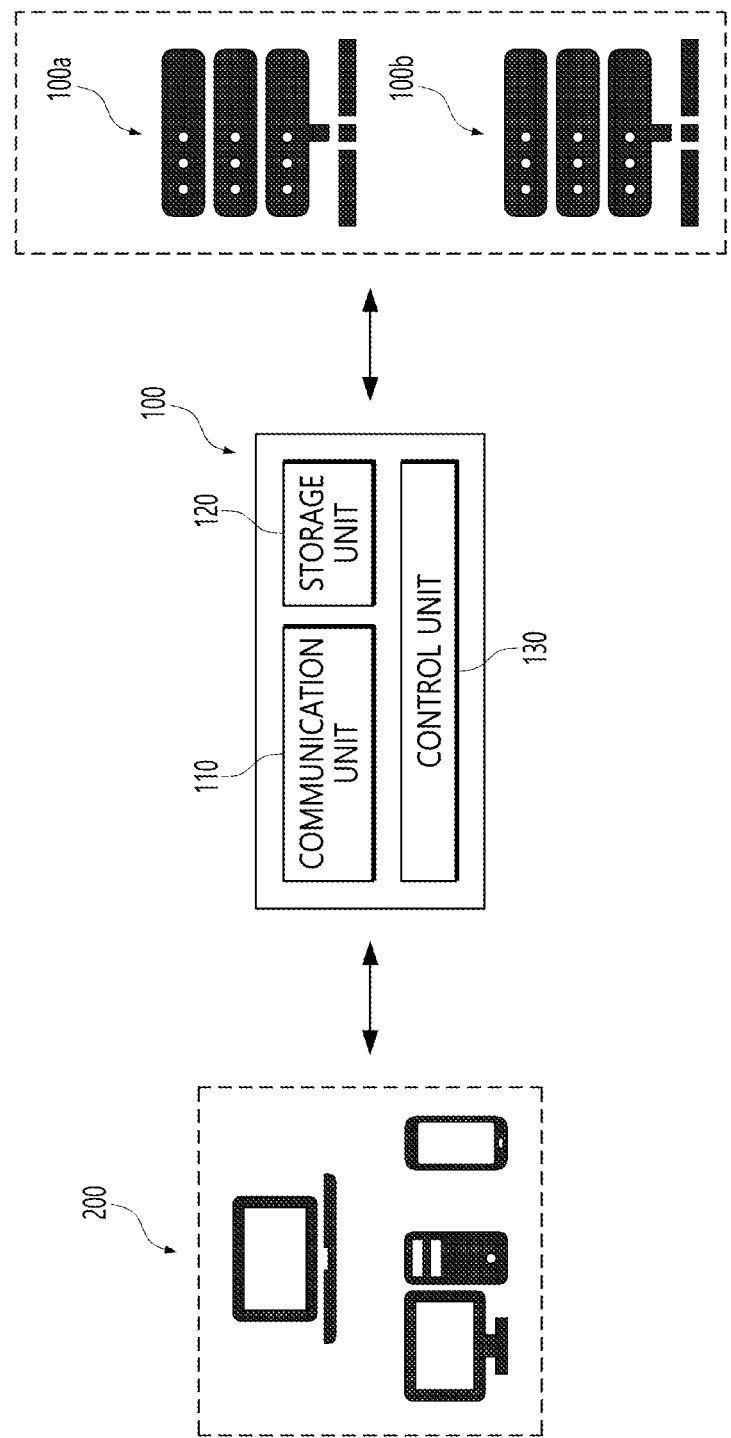
FIG. 2 is a block diagram for describing a system for providing contents according to the present invention.

Hereinafter, exemplary embodiments disclosed in the present specification will be described in detail with reference to the accompanying drawings. The same or similar constituent elements are assigned with the same reference numerals regardless of reference numerals, and the repetitive description thereof will be omitted. The terms 'module', 'unit', 'part', and 'portion' used to describe constituent elements in the following description are used together or interchangeably in order to facilitate the description, but the terms themselves do not have distinguishable meanings or functions. In addition, in the description of the exemplary embodiment disclosed in the present specification, the specific descriptions of publicly known related technologies will be omitted when it is determined that the specific descriptions may obscure the subject matter of the exemplary embodiment disclosed in the present specification. In addition, it should be interpreted that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present invention.

The terms including ordinal numbers such as "first," "second," and the like may be used to describe various constituent elements, but the constituent elements are not limited by the terms. These terms are used only to distinguish one constituent element from another constituent element.

Singular expressions include plural expressions unless clearly described as different meanings in the context.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

As illustrated in FIG. 1(a), the present invention may provide information (e.g., thumbnail, title, author name, etc.) on contents serialized by the day of the week, and sorted according to specific sorting criteria (e.g., by popularity, by star rating, by number of views, etc.), on a page 410 corresponding to a specific day of the week. A user of a mobile device may form a home screen with at least one page 410, preferably a plurality of different pages 410, for his or her mobile device. Respective pages 410 contain widget icons or menu icons. The mobile device may offer an icon tree organized by a number of widget icons or menu icons to be used for such home screen pages 410. The mobile device may also offer a menu for adding a new page 410 or deleting a page 410 used. Specifically, in order to form the home screen in the mobile device, a user may create a plurality of pages 410, for example, the first page 410 the second page 410 and the third page 410. Additionally, a user may dispose at least one widget icon in each page 410. For instance, the first page 410 may contain the first widget icon and the second widget icon. Similarly, the second page 410 may contain the third, fourth and fifth widget icons, and the third page 410 may contain the sixth, seventh and eighth widget icons. Here, a user may also create an additional page 410 (not shown) and then dispose additional widget icons in the added page 410. Meanwhile, a user may search for these pages 410 by using an input unit. For a page 410 search, the mobile device may have a key input unit allowing a navigation key input and/or a touch screen allowing a touch-based navigation input.

Further, as illustrated FIG. 1(b), the present invention may specify a customized recommended content for each user based on user information associated with each user account, and provide a recommendation indicator 430 overlapping a thumbnail 416 corresponding to the specified recommended content.

A user may be provided with both contents information and user-customized recommended contents according to ranking by day of the week.

Furthermore, the present invention may encourage the user to view the contents, thereby increasing content use and ensuring continuous content consumption.

As described in the present specification, the term "content providing service" may be understood to comprehensively include and refer to services provided by a system 100 for providing contents according to the present invention. The content providing service may be understood as providing a service for providing contents to a user terminal 200, as well as information related to the contents, and various functions necessary for using the contents.

Meanwhile, the system 100 for providing contents described in the present invention may be configured as a system for providing at least one of various types of contents.

The types of contents to which the present invention may be applied may be very diverse. For example, at least one of contents such as a webcomic or webcomics or comics, web novel, music, e-book, video, image, or the like may correspond to the contents provided by the present invention.

Hereinafter, for convenience of description, the content corresponding to a webcomic will be used as an example. As used herein, the term "webcomic" means a cartoon or comic strip provided through an Internet communication network.

The content may include at least one sub-content. When the sub-content is provided in plural, a plurality of sub-contents may constitute a series of contents.

Here, the term "series" may mean a series of projects or contents.

In the present invention, the term "sub-content" may be referred to as "episode" to avoid confusion between the terms content and sub-content. That is, the terms "sub-content" and "episode" may be used interchangeably in the present invention.

Furthermore, in the present invention, "using (consuming or viewing) a content" may be understood as using (consuming or viewing) an episode (or a sub-content).

Hereinafter, the system 100 for providing contents will be described with reference to the accompanying drawings, and the content providing service provided by the system 100 for providing contents will be described in detail. FIG. 2 is a conceptual view for describing a system for providing contents according to the present invention.

As illustrated in FIG. 2, the system 100 for providing contents may include at least a communication unit 110, a storage unit 120, and a control unit 130.

Here, the communication unit 110 may perform a role of providing (or transmitting) contents or various information related to the contents to the user terminal 200 through wired or wireless communication.

As illustrated in FIG. 2, the user terminal 200 is not limited to any type of device, and may be a cell phone, a smart phone, a notebook computer, a portable computer (laptop computer), a slate PC, a tablet PC, an ultrabook, a desktop computer, a digital broadcast terminal, a personal digital assistant (PDA), a portable multimedia player (PMP), a navigation device, a wearable device (e.g., a watch-type device (smartwatch), a glass-type device (smart glass), and a head mounted display (HMD)), and the like. In the present invention, the user terminal may be used interchangeably with a user terminal device, an electronic device, and the like.

Further, the communication unit 110 may receive a user input related to the content use from the user terminal 200. In the present invention, various services related to the content use may be provided to the user based on the user input received through the communication unit 110.

Next, the storage unit 120 may be configured to store various information related to the content use. The storage unit 120 may include at least one of a content server (content database (DB)) 100a that includes information on a plurality of contents, and an artificial intelligence recommender server (AI recommender system and artificial intelligence recommendation database (DB)) 100b that includes information used to select user-customized recommended contents based on artificial intelligence.

The information related to the content providing service of the present invention may be stored in at least a portion of the content server 100a and the artificial intelligence recommendation server 100b, and the present invention does not place any special limitation on this method. Accordingly, hereinafter, the storage unit 120, content server 100a, and artificial intelligence recommendation server 100b may not necessarily be separately distinguished, and may be represented as the storage unit 120.

In addition, hereinafter, the content server and the content DB are not distinguished from each other and are collectively referred to as the content server 100a, and the artificial intelligence recommendation server and the artificial intelligence recommendation DB are not distinguished from each other and are collectively referred to as the artificial intelligence recommendation server 100b. That is, the content server 100a described in the present invention can also be understood as the content DB, and the artificial intelligence recommendation server 100b may of course be understood as the artificial intelligence recommendation DB.

Further, the content server 100a and the artificial intelligence recommendation server 100b, which store a plurality of contents, may exist in a separate configuration from the storage unit 120. In this case, the system 100 for providing contents according to the present invention may provide information stored in at least one of the content server 100a and the artificial intelligence recommendation server 100b to the user terminal 200.

The storage unit 120 may be configured to store a plurality of contents and information associated therewith that may be provided by the system 100 for providing contents according to the present invention.

As illustrated in FIG. 5, in the storage unit 120, a plurality of contents may be matched on different days of the week and presented as matching information 510 and 520.

A plurality of contents matched to a specific day of the week may be understood as contents that are serialized on a specific day of the week.

For example, as illustrated in FIG. 5(a), the first to ninth contents 511 to 519 may be matched to a first specific serialized day of the week (e.g., "Thursday"). Further, as illustrated in FIG. 5(b), the tenth to eighteenth contents 521 to 529 may be matched to a second specific serialized day of the week (e.g., "Friday").

The first to ninth contents 511 to 519 matched to the first specific serialized day of the week (e.g., "Thursday") may be understood to be serialized on the first specific day of the week (e.g., "Thursday"). Further, the tenth to eighteenth contents 521 to 529 matched on the second specific day of the week (e.g., "Friday") may be understood to be serialized on the second specific day of the week (e.g., "Friday").

Meanwhile, a specific content may be matched to both the first specific day of the week and the second specific day of the week. In this case, the specific content may be understood to be serialized on the first specific day of the week and the second specific day of the week, respectively.

According to one embodiment, the storage unit 120 may include ranking information for each of the plurality of contents. The ranking information may be matched to the respective contents and stored in the storage unit 120.

The ranking information on the contents may be acquired according to various criteria. For example, the ranking information on the contents may be acquired based on criteria such as popularity, number of views (number of clicks), star ratings (evaluation score), paid purchases, etc. of a plurality of contents matched on a specific day of the week.

The ranking information on the contents may be stored as an accumulation of rankings (or ranking information) for each of a plurality of time points at which the ranking was acquired (or calculated). That is, the ranking for the contents may be managed as a ranking history, so that a history of ranking changes may be identified.

Further, in the storage unit 120, user information associated with a user account subscribed to the content providing service according to the present invention may be stored.

As used herein, the term "user information" includes various information on the user account related to the content providing service, which may include profile information (e.g., age, gender, region, etc.) and history information on the user account.

Here, the history information may include information related to contents used (viewed or owned) by the user account (or the user terminal 200 to which the user account is logged in). For example, the history information may include at least one of i) history information on contents viewed in the user account (e.g., title of the viewed contents, episode number of the viewed episode, viewing date information, recency information, information on serialized day of the week, popularity information, information on contents viewed together, etc.), ii) feedback information on the user account for specific contents (e.g., review information, comment information, rating information, reaction information on contents recommendation, history of selecting an exit function icon in a pop-up window related to specific contents), iii) information related to an access pass (e.g., number of access passes owned, types of access passes owned, types of access passes used, dates of access passes used, events for which access passes were awarded, etc.), iv) preference information on the user account (e.g., genre information preferred by the user account, author information, time information of content use, information on type of content use, etc.), and v) information related to content viewing methods (e.g., information on access passes owned, information on electronic money owned, whether or not there is a history of regular payment registration, etc.).

In the present invention, contents that are of interest to a user may be recommended in a customized manner by considering the user information (or history information) associated with the user account.

Specifically, in the present invention, unviewed contents that have not been viewed by the user account, contents that are expected to be preferred by the user account, and the like may be specified as recommended contents based on the history information associated with the user account.

Further, in the present invention, information on the specified recommended contents (e.g., the recommendation indicator, see the reference numeral 430 in FIG. 1(b)) may be displayed on the user terminal 200.

The user may refer to the information on recommended contents provided by the present invention to facilitate the selection for the content use.

The system 100 for providing contents according to the present invention may include a history server (not illustrated, or history database (DB)).

User information or history information associated with a user may be stored on the history server (not illustrated). For example, the history server (not illustrated) may store history information that includes history information on contents viewed by the user account and information related to an access pass assigned to the user account.

The history server (not illustrated) that stores a plurality of history information may be present as part of the storage unit 120, or may be present as a separate configuration from the storage unit 120.

When the history server is present separately from the storage unit 120, the system 100 for providing contents may refer to the history server (not illustrated) to recommend contents for the user account.

Next, the control unit 130 may perform a series of processes related to the content providing service. Further, the control unit 130 may perform a role in controlling the configurations described above.

In an alternate embodiment, the role of control unit 130 may be configured to be performed by at least one of the content server 100a and artificial intelligence recommendation server 100b described above.

In an example, among the roles performed by the control unit 130, a series of processes of providing contents may be configured to be performed by the content server 100a and a series of processes of selecting user-customized recommended contents based on artificial intelligence may be configured to be performed by the artificial intelligence recommendation server 100b.

However, the present invention does not place any specific limitations on the subject performing the role related to the content providing service. Therefore, hereinafter, the control unit 130, content server 100a, and artificial intelligence recommendation server 100b may not necessarily be separately distinguished from each other, and may be described by being represented as the control unit 130. That is, a function that is described below as being performed by the control unit 130 may be performed by at least one of the content server 100a and the artificial intelligence recommendation server 100b.

The control unit 130 may sort each of thumbnails of a plurality of contents serialized by the day of the week, according to any one of a plurality of preset sorting criteria, and provide the thumbnails on a page corresponding to a specific serialized day of the week.

Here, the preset sorting criteria may be set in various ways by an administrator of the system 100 and the control unit 130. For example, the preset sorting criteria may be based on popularity (overall popularity, popularity by age, popularity by gender, etc.), star rating, number of views, number of reviews, or time point updated.

Further, the control unit 130 may display the recommendation indicator 430 overlapping any one of the plurality of thumbnails sorted according to the preset sorting criteria.

The thumbnail displaying the recommendation indicator 430 may correspond to the recommended content specified for being recommended to the user account among a plurality of contents serialized on a specific day of the week.

The control unit 130 may specify customized recommended contents for each user account based on the user information associated with the user account.

That is, the control unit 130 may specify different recommended contents for each user account based on the user information associated with the user account. Further, the control unit 130 may overlap the recommendation indicators 430 on different thumbnails based on recommended contents being differently specified for each user account.

The control unit 130 may include any type of device capable of processing data, such as a processor. Here, the processor may refer to a hardware built-in data processing device having a circuit physically structured to perform a function expressed in a code or instructions included in a program. Examples of the hardware built-in data processing device may include processing devices such as a microprocessor, a central processing unit (CPU), a processor core, a multiprocessor, an application-specific integrated circuit (ASIC), a field programmable gate array (FPGA), etc., but the scope of the present invention is not limited thereto.

Figure 3:
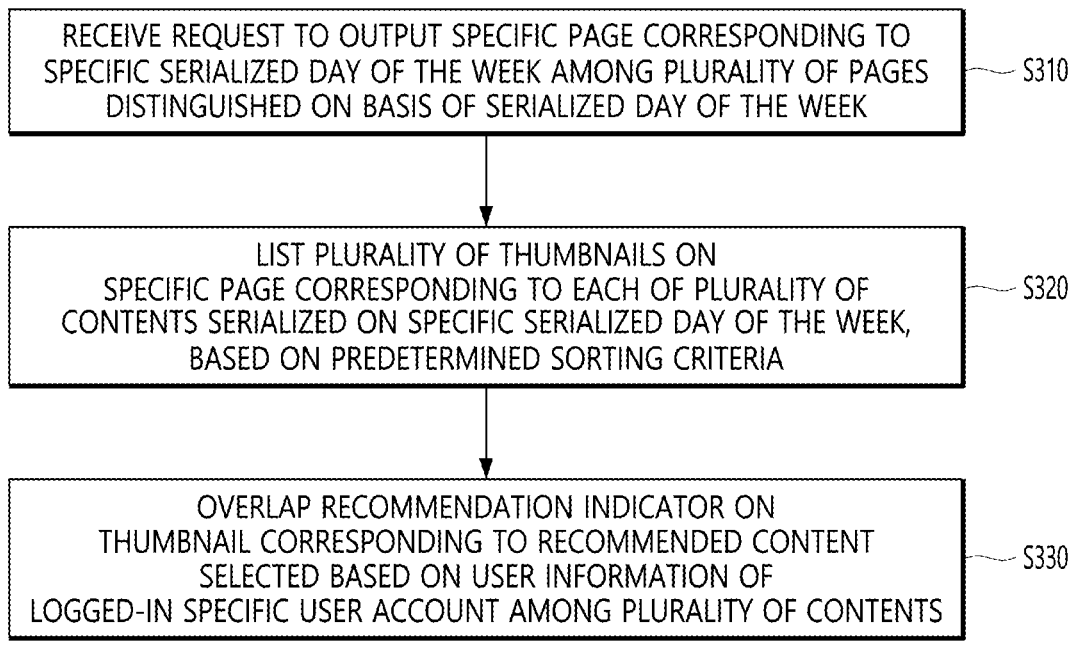
FIG. 3 is a flowchart for describing a method of providing contents according to the present invention.
Figure 4:
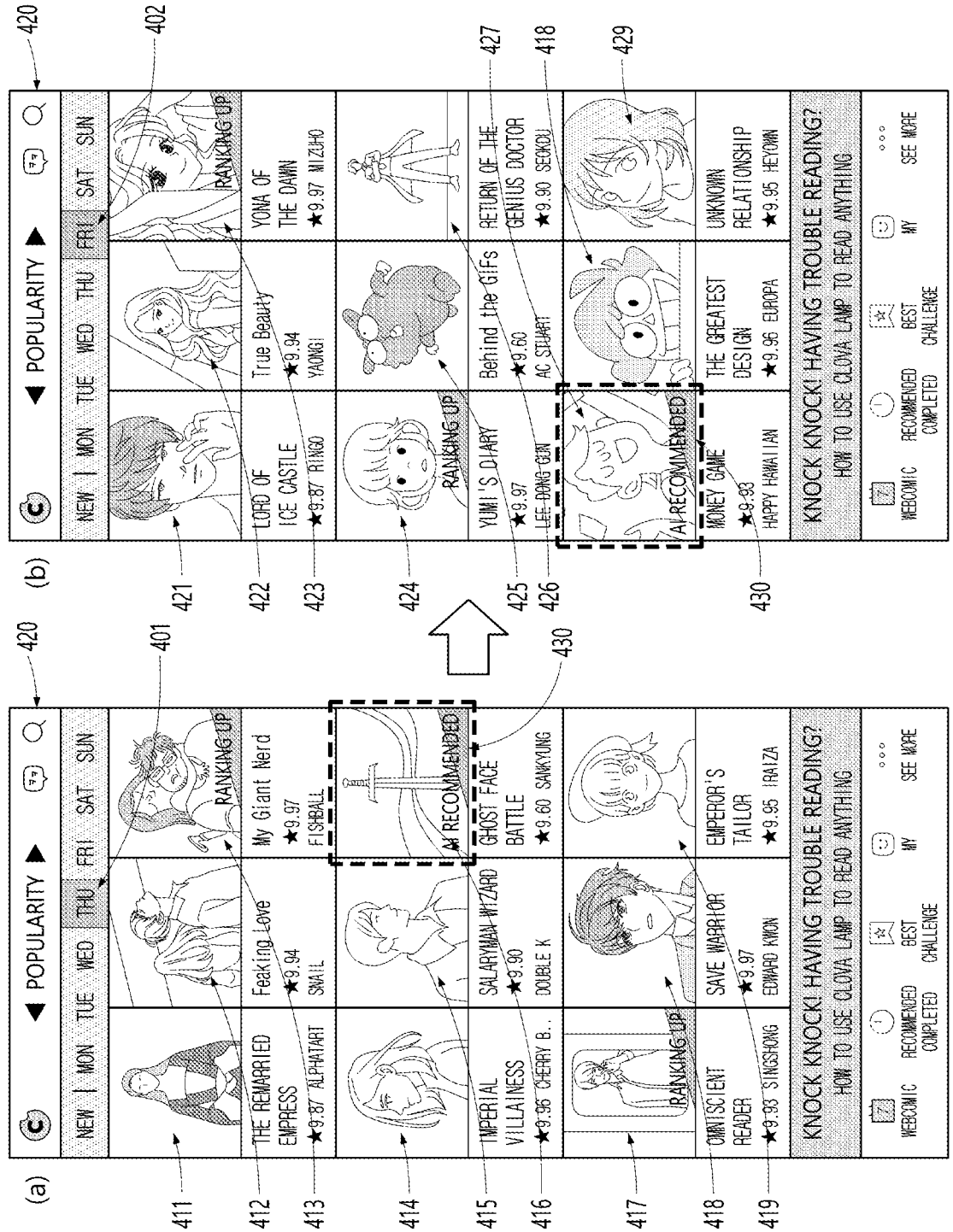
Figure 6A:
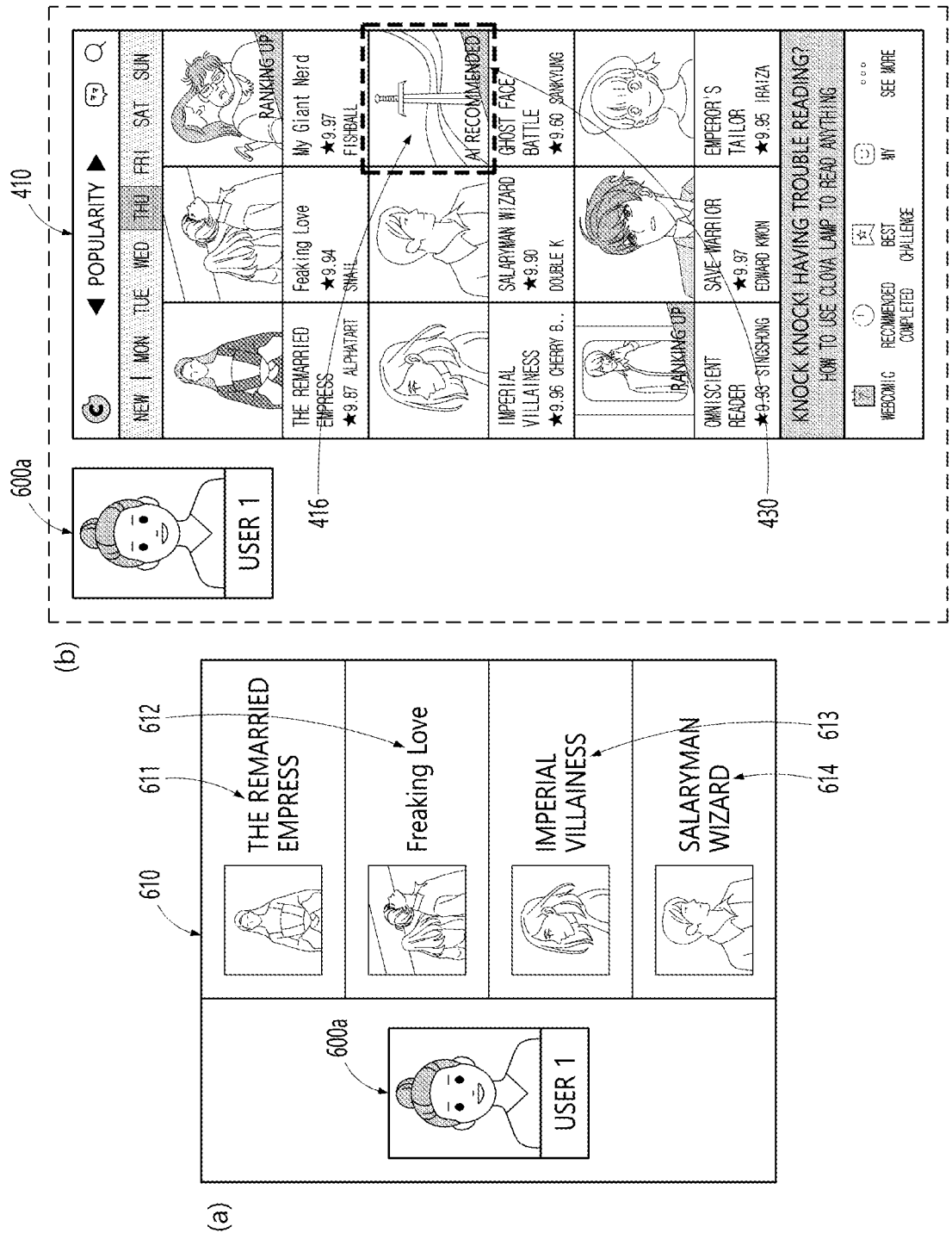
Figure 8:
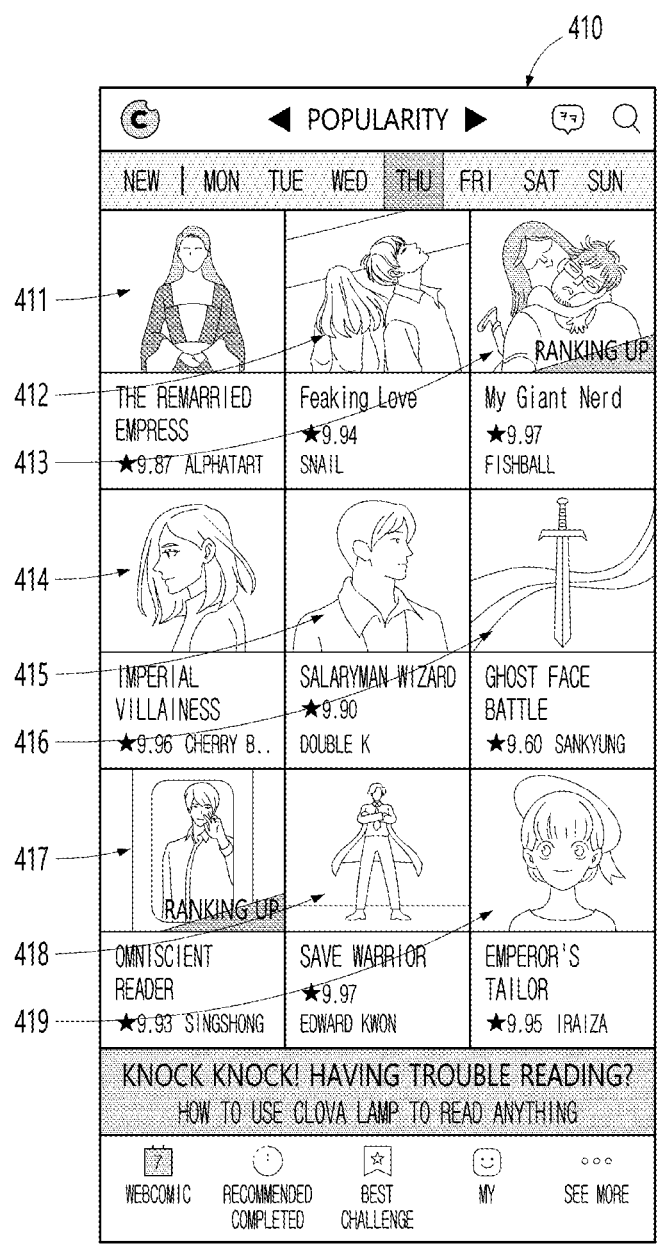
FIG. 8 is a conceptual illustration for describing a page served on a non-login user's electronic device.
Figure 9:
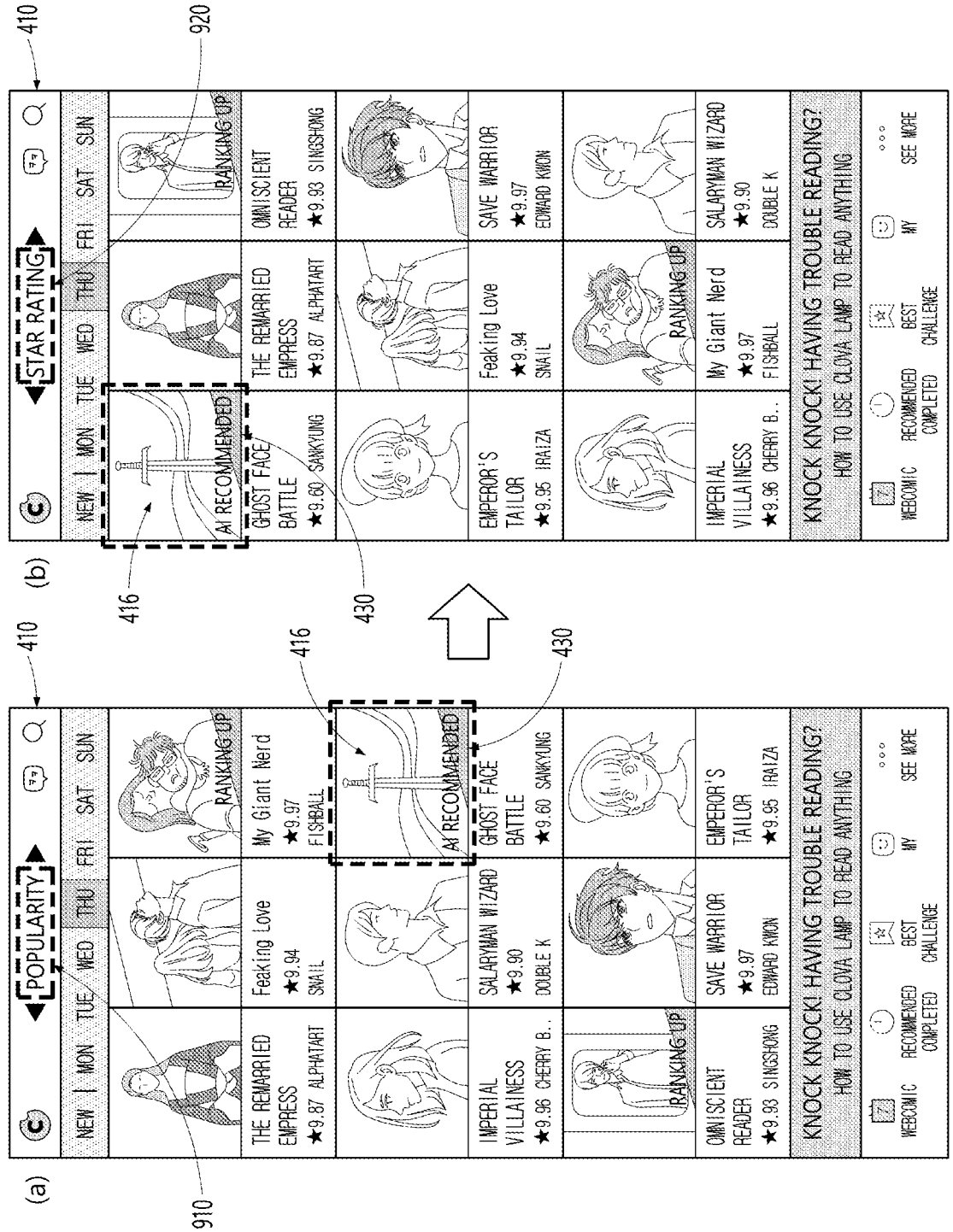
FIG. 9 is a conceptual illustration for describing a method of providing recommended contents according to sorting criteria.

Hereinafter, with reference to the accompanying drawings, a method of providing user-customized recommended contents according to the present invention will be described in more detail. FIG. 3 is a flowchart for describing a method of providing contents according to the present invention. FIGS. 4 and 5 are conceptual illustrations for describing a method of providing recommended contents on the basis of serialized days of the week, FIGS. 6A and 6B are conceptual illustrations for describing a method for providing recommended contents on the basis of user information, FIG. 8 is a conceptual illustration for describing a page served on a non-login user's electronic device, and FIG. 9 is a conceptual illustration for describing a method of providing recommended contents according to sorting criteria.

In a method of providing contents according to the present invention, a process of receiving, from the user terminal 200, a request to output a specific page corresponding to a specific day of the week among a plurality of pages distinguished on the basis of a day of the week may proceed (S310).

As illustrated in FIG. 4, in the present invention, there may be pages 410 and 420 corresponding to each of the different serialized days of the week. The control unit 130 may display thumbnails of contents being serialized on a specific day of the week, on a page corresponding to a specific day of the week (e.g., a page corresponding to "Thursday" 401).

The control unit 130 may refer to matching information matched to a specific day of the week from the storage unit 120 to display a thumbnail of each of a plurality of contents serialized on the specific day of the week on a page corresponding to the specific day of the week.

As illustrated in FIG. 5, in the storage unit 120, there may be matching information 510 and 520 in which a plurality of contents are matched for each different day of the week.

In the present invention, the contents that are matched on a specific day of the week may be understood as the contents that are serialized on a specific day of the week.

For example, as illustrated in FIG. 5(a), the first to ninth contents 511 to 519 may be matched to a first specific day of the week (e.g., "Thursday"). Further, as illustrated in FIG. 5(b), the tenth to eighteenth contents 521 to 529 may be matched to a second specific day of the week (e.g., "Friday").

The first to ninth contents 511 to 519 matched to the first specific day of the week (e.g., "Thursday") may be understood to be serialized on the first specific day of the week (e.g., "Thursday"). Further, the tenth to eighteenth contents 521 to 529 matched on the second specific day of the week (e.g., "Friday") may be understood to be serialized on the second specific day of the week (e.g., "Friday").

A specific content may be matched to both the first specific day of the week and the second specific day of the week. In this case, the specific contents may be understood to be serialized on the first specific day of the week and the second specific day of the week, respectively.

A request to output a specific page corresponding to a specific day of the week may be made in a variety of ways. For example, the control unit 130 may receive a request to output a page corresponding to the current day of the week, based on the current day of the week. The control unit 130 may receive a request to output a page corresponding to Thursday from the user terminal 200 based on the current day of the week being Thursday. In addition, the control unit 130 may receive a request to output a page corresponding to Friday from the user terminal 200 based on the current day of the week being Friday.

As another example, the control unit 130 may receive a request to output a page corresponding to a specific day of the week, based on a graphical object corresponding to the specific day of the week being selected.

As illustrated in FIGS. 4(a) and 4(b), the control unit 130 may provide graphical objects 401 and 402 corresponding to each of a plurality of days of the week (e.g., "Monday through Sunday"), on the page 410.

When a graphic object corresponding to a specific day of the week is selected among the plurality of graphic objects 401 and 402, the control unit 130 may receive a request to output a specific page corresponding to the specific day of the week.

For example, as illustrated in FIG. 4(a), the control unit 130 may receive a request to output a first specific page 410 corresponding to a first specific day of the week (e.g., "Thursday"), based on the graphical object 401 corresponding to the first specific day of the week being selected.

For example, as illustrated in FIG. 4(b), the control unit 130 may receive a request to output a second specific page 420 corresponding to a second specific day of the week (e.g., "Friday"), based on the graphical object 402 corresponding to the second specific day of the week being selected.

In the method of providing contents according to the present invention, a process of identifying a specific user account logged in to the user terminal and identifying recommended contents for the specific user account among a plurality of contents provided on a specific day of the week may proceed (S320).

The control unit 130 may identify (determine) customized recommended contents for each user account based on the user information associated with the user account. Specifically, the control unit 130 may determine contents satisfying a preset viewing condition and a ranking condition among a plurality of contents provided on a specific day of the week as recommended contents for the user account.

Here, the recommended contents satisfying the preset viewing condition may be unviewed contents that have not been viewed by a specific user account among a plurality of contents serialized on a specific day of the week, or contents that have been viewed by a specific user account less than a preset number of times.

The control unit 130 may determine unviewed contents that have not been viewed by a specific user account, or that have been viewed by a specific user account less than a preset number of times, among a plurality of contents on a specific day of the week, as recommended contents, based on the user information (history information) associated with each user account.

For example, as illustrated in FIG. 6A(a), user information 610 matched to a first user account 600a may not include a history of viewing "ghost face battle" content. That is, the "ghost face battle" content may correspond to unviewed content among a plurality of contents serialized on a specific day of the week (e.g., "Thursday") for the first user account 600a.

Accordingly, as illustrated in of FIG. 6A(b), when there is a request to output a specific page corresponding to a specific day of the week (e.g., "Thursday") from the first user account 600a, the control unit 130 may determine the "ghost face battle" content that has no history of being viewed by the first user account 600a among a plurality of contents serialized on the specific day of the week as a recommended content for the first user account.

Further, the recommended contents satisfying the preset ranking condition may be related to popularity in a user group that is determined based on the user information associated with the user account.

The control unit 130 may determine contents that is recommended for a user group to which a user of a specific user account belongs, among a plurality of contents, as recommended contents for the user account. For example, the control unit 130 may determine content that is most popular in the user group to which the user of the user account belongs as a recommended content for the user account.

In this case, even though the control unit 130 receives a request to output a page for the same day of the week from the first user account and the second user account included in the same user group, the recommended contents may be the same or different from each other depending on the content viewing history of the first user account and the second user account.

When the control unit 130 receives a request to output a page for the first day of the week from the first user account and the second user account included in the first user group among a plurality of user groups, the same or different recommended contents may be recommended depending on the content viewing history of each of the first user account and the second user account.

Specifically, it is assumed that there is a first content that is most popular on the first day of the week among the first user group, and a second content that is second most popular after the first content.

Further, when the viewing history of the first user account satisfies the viewing condition described above for the first content and the second content, the control unit 130 may determine the first content as the recommended content for the first user account.

In contrast, when the viewing history of the second user account does not satisfy the viewing condition for the first content, but satisfies the viewing condition for the second content, the control unit 130 may determine the second content as the recommended content for the second user account.

In the method of providing contents according to the present invention, a process of providing a specific page listing at least some of a plurality of contents serialized on a specific day of the week and a plurality of thumbnails corresponding to each of recommended contents to the user terminal may proceed (S330), according to predetermined sorting criteria.

The control unit 130 may list a plurality of thumbnails corresponding to each of a plurality of contents serialized on a specific day of the week on a specific page, according to preset sorting criteria for the plurality of contents.

As described above, the storage unit 120 may have the matching information 510 and 520 matched for each day of the week. Further, the matching information 510 matched on a specific day of the week (e.g., "Thursday") may include information on the plurality of contents 511 to 519 serialized on the specific day of the week (see FIG. 5).

The control unit 130 may display a plurality of thumbnails 411 to 419 corresponding to each of the plurality of contents 515 to 519 serialized on a specific day of the week, on the specific page 410, with reference to the matching information 510 matched to the specific day of the week.

In this case, the control unit 130 may display a plurality of different thumbnails on a specific page when the specific days of the week corresponding to the output requests are different from each other.

For example, as illustrated in FIG. 4(*a*), when there is a request to output the specific thumbnails 411 to 419, corresponding to each of the first to ninth contents serialized on "Thursday", on the specific page 410.

In contrast, as illustrated in FIG. 4(*b*), when there is a request to output the specific page 410 corresponding to "Friday," the control unit 130 may display tenth to eighteenth thumbnails 421 to 429 corresponding to each of the tenth to eighteenth contents.

Further, the control unit 130 may list (or sort) and display the plurality of thumbnails 411 to 419 according to any one of a plurality of preset sorting criteria, on the specific page 410 corresponding to a specific day of the week.

Here, the preset sorting criteria may be set in various ways by an administrator of the system 100 and the control unit 130. For example, the preset sorting criteria may be set based on popularity (overall popularity, popularity by age, popularity by gender, etc.), star rating, number of views, number of reviews, or time point updated.

The control unit 130 may sequentially dispose the plurality of thumbnails on an area of a page corresponding to the ranking based on one of the plurality of preset sorting criteria.

For example, as illustrated in FIG. 4(*a*), the control unit 130 may list (or sort) and display the thumbnails, starting with a thumbnail corresponding to the content with the highest "popularity" ranking among a plurality of contents serialized on a specific day of the week, on the specific page 410 corresponding to "Thursday".

Specifically, the control unit 130 may display a thumbnail 411 of the content corresponding to the first popularity ranking in the first area on the specific page 410 corresponding to the first popularity ranking. Further, the control unit 130 may display a thumbnail of the content corresponding to the second popularity ranking lower than the first popularity ranking in a second area on the specific page 410 corresponding to the second popularity ranking, and a thumbnail of the content corresponding to a third popularity ranking lower than the second popularity ranking in a third area on the specific page 410 corresponding to the third popularity ranking.

Meanwhile, on the user terminal 200, a portion of a specific page corresponding to a specific day of the week may be displayed.

The control unit 130 may display only thumbnails of some contents corresponding to a preset number of contents among the plurality of contents serialized on the specific day of the week, on the portion of the specific page.

Further, the control unit 130 may allow the recommended contents to include some contents corresponding to the preset number of contents.

That is, when the control unit 130 provides the thumbnails of some contents among the plurality of contents serialized on a specific day of the week to the user terminal 200, the control unit 130 may control that the thumbnails provided to include the recommended contents in the user account.

Further, the control unit 130 may select at least some contents to provide information as thumbnails on a specific page based on the user information according to a specific user account.

Further, the control unit 130 may provide at least one of thumbnails for different contents on a specific page based on the user information.

Specifically, the control unit 130 may provide a thumbnail for different content, based on the user information associated with the user account (at least one of the user's age, gender, and genre preference based on a history of content viewed in the past), according to the user information.

Further, the control unit 130 may overlay the recommendation indicator on a specific thumbnail corresponding to the recommended content among the plurality of thumbnails.

The control unit 130 may provide the recommendation indicator 430 with the thumbnail corresponding to a specific content selected based on the user information on a specific logged-in user account from the plurality of contents.

The recommendation indicator may include guidance information indicating why the recommended content has been selected as the recommended content. For example, as illustrated in FIG. 4(a), the control unit 130 may provide the recommendation indicator 430 including guidance information (e.g., "AI recommended") that overlays on any one thumbnail 416 of the plurality of thumbnails 411 to 419.

In this case, the control unit 130 may display the recommendation indicator overlaying on the thumbnail 416 corresponding to the content that is expected to be preferred in the user account among the plurality of contents serialized on a specific day of the week.

The control unit 130 may select a content that is expected to be preferred in the user account as a recommended content, based on the user information associated with the user account.

The control unit 130 may select a content satisfying a preset condition (criteria) among the plurality of contents as a recommended content for the user account.

For example, the control unit 130 may select an unviewed content that has not been viewed in the user account as a recommended content for the user account based on the user information (history information) associated with the user account.

As illustrated in FIG. 6A(a), the user information 610 associated with the first user account 600a may include information on viewed contents that have been viewed in the first user account 600a (e.g., "the remarried empress," "freaking love," "imperial villainess," "salaryman wizard," 611 to 614).

The control unit 130 may specify an unread content (e.g., "ghost face battle" 516) that has not been viewed in the first user account 600a among a plurality of contents (see the reference numerals 511 to 519 in FIG. 5) serialized on a specific day of the week (e.g., "Thursday") as a recommended content.

As illustrated in FIG. 6A(b), the control unit 130 may overlay the recommendation indicator 430 on the thumbnail 416 corresponding to a recommended content (e.g., "ghost face battle") among a plurality of contents serialized on a specific day of the week on the electronic device 200 that is logged in with the first user account 600a.

When an item corresponding to the recommended content is selected by the user terminal 200, the control unit 130 may provide an episode page including an episode list of the episodes that constitute the recommended content on the user terminal 200.

Hereinafter, a method of overlaying the recommendation indicator on a thumbnail corresponding to a specific content, based on the user information associated with the user account, will be described in more detail.

The content providing service according to the present invention may be configured to provide the plurality of pages corresponding to each of the different days of the week. Further, the control unit 130 may configure the plurality of pages such that each of the plurality of pages includes a thumbnail of one of the recommended contents recommended for a specific user account.

The control unit 130 may overlay the recommendation indicator on a thumbnail of a first recommended content that satisfies a viewing condition and a recommendation condition for a specific user account among a plurality of contents serialized on a first day of the week on a first page corresponding to the first day of the week among different days of the week.

Further, the control unit 130 may overlay the recommendation indicator on a thumbnail of a second recommended content that satisfies a viewing condition and a recommendation condition for the specific user account among a plurality of contents serialized on a second day of the week on a second page corresponding to the second day of the week.

In this case, the first recommended content and the second recommended content may be different from each other.

That is, the control unit 130 may overlay the recommendation indicators 430 on different thumbnails, according to the day of the week corresponding to a page in which there is a request to output from a specific user account.

To this end, the control unit 130 may select a recommended content for each of the days associated with a specific user account, based on the user information associated with the specific user account.

The control unit 130 may specify an unviewed content that has no history of being viewed in the user account among the plurality of contents serialized on each of the days of the week as a recommended content for each of the days of the week.

Further, the control unit 130 may overlay the recommendation indicator 430 on a thumbnail corresponding to the recommended content of a specific day of the week based on a request to output a page corresponding to the specific day of the week among the plurality of days of the week.

For example, as illustrated in FIG. 4(a), on the page 410 corresponding to the first day of the week (e.g., "Thursday"), the recommendation indicator 430 may overlay on the thumbnail 416 corresponding to an unviewed content ("ghost face battle" 516) that has no history of being viewed in the first user account 600a among a plurality of content serialized on the first day of the week (see the reference numerals 511 to 519 in FIG. 5A).

In contrast, as illustrated in FIG. 4(b), at the page 420 corresponding to the second day of the week (e.g., "Friday"), the recommendation indicator 430 may overlay on a thumbnail 427 corresponding to an unviewed content ("money game" 527) that has no history of being viewed in the first user account 600a among a plurality of content serialized on the second day of the week (see the reference numerals 521 to 529 in FIG. 5(b)).

The control unit 130 may overlay the recommendation indicator 430 on thumbnails corresponding to different contents based on the user information associated with each of the different user accounts, even if there are requests to output pages corresponding to the same serialized day of the week.

That is, the control unit 130 may overlay the recommendation indicator on the thumbnails corresponding to the different contents when an unread content in each of the first user account and the second user account is different from each other, even if there are requests for output pages for the first day of the week in the first user account and the second user account.

Specifically, the control unit 130 may overlay the recommendation indicator on the thumbnails corresponding to the different contents based on the viewed content that has been viewed (or unviewed content that has not been viewed) in each of the first user account 600a and the second user account 600b, even though there are requests to output pages corresponding to the same day of the week from the first user account 600a and the second user account 600b.

For example, as illustrated in FIG. 6A(a), user information 610 matched to the first user account 600a may not include a history of viewing "ghost face battle" content. That is, the "ghost face battle" content may correspond to unviewed content among a plurality of contents serialized on a specific day of the week (e.g., "Thursday") for the first user account 600*a*.

Accordingly, as illustrated in FIG. 6A(b), the control unit 130 may overlay the recommendation indicator 430 on the thumbnail 416 corresponding to the "ghost face battle" content that has no history of being viewed by the first user account 600*a* among a plurality of contents serialized on a specific day of the week (e.g., "Thursday") when there is a request to output a specific page corresponding to the specific day of the week from the first user account 600*a*.

In contrast, as illustrated in FIG. 6B(a), the user information 620 associated with the second user account 600*b* may include a viewing history of a "ghost face battle" content 622. That is, for the second user account 600*b*, the "ghost face battle" content may correspond to the viewed content.

Accordingly, as illustrated in FIG. 6B(b), when there is a request to output a specific page corresponding to a specific day of the week (e.g., "Thursday") from the second user account 600*b*, the control unit 130 may overlay the recommendation indicator 430 on the thumbnail 411 corresponding to "the remarried empress" content that has no history of being viewed in the second user account 600*b*, rather than on the thumbnail 416 corresponding to the "ghost face battle" content that has a history of being viewed in the second user account 600*b*, among a plurality of contents serialized on the specific day of the week.

Further, when the control unit 130 receives a request to output a page for the first day of the week from the first user account and the second user account included in the first user group of the plurality of user groups, the control unit 130 may overlay the recommendation indicator on the same or different recommended content based on the content viewing history of the first user account and the second user account, respectively.

Specifically, it is assumed that there is a first content that is most popular on the first day of the week among the first user group, and a second content that is second most popular after the first content.

The control unit 130 may overlay the recommendation indicator on a thumbnail corresponding to the first content on a page for the first day of the week provided to the first user account, based on the viewing history of the first user account satisfying the viewing condition described above for the first content and the second content.

In contrast, the control unit 130 may overlay the recommendation indicator on a thumbnail corresponding to the second content on a page for the first day of the week provided to the second user account, based on the viewing history of the second user account not satisfying the viewing condition for the first content and satisfying the viewing condition for the second content.

The control unit 130 may determine any one of the plurality of recommended contents as a recommended content, excluding the contents that do not satisfy the viewing condition when there is a plurality of recommended contents satisfying the recommendation condition among a plurality of contents.

As illustrated in FIG. 7, the storage unit 120 may have criteria information 700 on criteria for selecting a recommended content from a plurality of contents serialized on a specific day of the week.

The criteria information 700 may include information on contents that should be excluded from selection as recommended contents among a plurality of contents serialized on a specific day of the week. In the present invention, the criteria information 700 may also be referred to as recommendation exclusion criteria information. Furthermore, in the present invention, both the criteria information and the recommendation exclusion criteria information may be given the reference numeral "700".

The recommendation exclusion criteria information 700 may include i) content viewed in the user account 710, ii) content of interest in the user account 720, iii) recommendation rejected content from the user account 730, iv) brand content 740 (e.g., content containing a promotion of a company), v) public entity content 750 (e.g., content containing a promotion of a public entity), vi) restricted content for youth 760 (or adult content, but not applicable if the user account is of legal age), vii) blacklisted content 770 (e.g., content categorized as blacklisted), viii) unserved content 780 (e.g., content for which the content providing service is pending or terminated), and ix) long-term dormant content 790 should be excluded from the selection of the recommended content.

The control unit 130 may select the recommended content from unviewed contents that have not been viewed, excluding viewed contents that have been viewed in the user account, among a plurality of contents serialized on a specific serialized day of the week.

In this case, the control unit 130 may select the recommended content from the remaining contents, even if the contents are unviewed, excluding the content of interest in the user account or recommendation rejected content, brand content, public entity content, content of interest or recommendation rejected content that rejected recommendation, restricted content for youth, unserved content, and long-term dormant content.

In the present invention, the remaining contents that are excluded based on the recommendation exclusion criteria information 700 among the plurality of contents serialized on a specific day of the week may be referred to as "candidate content." However, hereinafter, for convenience of description, a case in which "candidate content" is "unviewed content" will be described as an example. Accordingly, "unviewed content" as described in the present invention may also be understood as "candidate content".

The control unit 130 may select (specify or determine) a content satisfying a specific condition as an unviewed content based on the user information associated with the user account.

The control unit 130 may select the unviewed content based on various conditions. These various conditions may be set by at least one of an administrator of the system 100 and the control unit 130.

For example, the control unit 130 may determine the content that has been viewed less than a preset number of times in the user account over a predetermined period of time (e.g., less than three times in a six-month period) as the unviewed content.

That is, the control unit 130 may determine the content that has been viewed equal to or greater than a preset number of times in the user account over a predetermined period of time (e.g., 3 or more times in a six-month period) as the viewed content.

For example, as illustrated in FIG. 6B(b), when the "ghost face battle" content 622 has a history of being viewed "once" in the second user account 600*b*, the control unit 130 may determine the "ghost face battle" content 622 as the unviewed content.

The control unit 130 may select and specify any one of a plurality of unviewed contents as the recommended content when there is a plurality of unviewed contents in the user account among a plurality of contents serialized on a specific day of the week.

In this case, the control unit 130 may select a content that is expected to be of interest in the user account as the recommended content among the plurality of unviewed contents based on the user information associated with the user account.

The control unit 130 may select any one of the plurality of unviewed contents as the recommended content based on age, preferences (preferred genre, preferred author, etc.), and gender of a specific user account.

For example, the control unit 130 may expect a specific user account to be interested in a content that has been viewed in a different user account that corresponds to the age of the specific user account. Further, the control unit 130 may select the content viewed in the different user account as a recommended content for the specific user account.

As another example, the control unit 130 may calculate points (or scores) for a plurality of contents serialized on a specific day of the week, based on the user information associated with the user account. Further, the control unit 130 may select the recommended content among the plurality of unviewed contents based on the calculated score. For example, the control unit 130 may select a content with the highest calculated score among the plurality of unread content as the recommended content.

Criteria (methods) for calculating scores for a plurality of contents may vary. For example, the control unit 130 may calculate scores for the plurality of contents based on popularity, number of views, ratings, reviews, and paid purchases of a plurality of contents serialized on a specific day of the week.

In one embodiment, the control unit 130 may make the recommendation indicator 430 overlaying on a thumbnail of a specific content disappear when a predetermined condition is met.

The predetermined condition that causes the recommendation indicator 430 to disappear may vary. These various conditions may be set by at least one of an administrator of the system 100 and the control unit 130.

For example, when a specific content is viewed a preset number of times (or a predetermined number of times, e.g., "3 times"), the control unit 130 may remove the recommendation indicator 430 from the thumbnail of the specific content.

In this case, the control unit 130 may overlay the recommendation indicator 430 on a thumbnail of a content different from the specific content based on the recommendation indicator 430 disappearing from the thumbnail of the specific content.

For example, the control unit 130 may overly the recommendation indicator 430 on a thumbnail of a content that is expected to be of interest next to the specific content in the user account among the plurality of unviewed contents.

As another example, the control unit 130 may overlay the recommended indicator on a thumbnail of a content that has the second highest calculated score (or the second highest after the specific content) among the plurality of unviewed content.

As illustrated in FIG. 8 and in accordance with another embodiment, the control unit 130 may not display the recommendation indicator 430 on any of the plurality of thumbnails 411 to 419 that correspond to each of the plurality of contents when there is no recommended content among the plurality of contents serialized on a specific day of the week.

For example, the control unit 130 may determine that the recommended content does not exist when the control unit 130 receives a request for a specific page corresponding to a specific day of the week from a non-logged in electronic device 200. The control unit 130 may not display the recommendation indicator 430 on a specific page provided to the non-logged-in electronic device 200.

That is, the control unit 130 may not overlay the recommendation indicator on the thumbnails corresponding to the contents serialized on the specific day of the week included in the specific page when the control unit 130 receives a request to output a specific page corresponding to a specific day of the week from a user terminal to which the user account is not logged in.

Further, the control unit 130 may determine that the recommended content does not exist when there is no unviewed content from the specific user account among the plurality of contents serialized on a specific serialized day of the week. That is, the control unit 130 may not display the recommendation indicator 430 in the specific user account when all of the plurality of contents serialized on a specific day of the week have been viewed.

In one embodiment, the control unit 130 may list (or sort) and display a plurality of thumbnails on the specific page 410 corresponding to a specific day of the week according to any one of a plurality of sorting criteria.

Here, the preset criteria may vary. For example, the preset sorting criteria may be set based on at least one of popularity, star rating (or rating score), time point updated, and number of views for each of a plurality of contents serialized on a specific day of the week.

The control unit 130 may sequentially dispose the plurality of thumbnails based on one of the plurality of preset sorting criteria, according to the ranking according to the one of the plurality of preset sorting criteria.

That is, the control unit 130 may sequentially list a plurality of thumbnails included in the specific page according to the popularity ranking of the plurality of contents associated with at least one of a plurality of different popularity criteria.

For example, the control unit 130 may display a thumbnail 411 of the content corresponding to the first popularity ranking in a first area corresponding to the first popularity ranking. Further, the control unit 130 may display a thumbnail of the content corresponding to the second popularity ranking lower than the first popularity ranking in a second area corresponding to the second popularity ranking, and a thumbnail of the content corresponding to the third popularity ranking lower than the second popularity ranking in a third area corresponding to the third popularity ranking.

The control unit 130, based on the sorting criteria being changed, may rearrange and dispose a plurality of thumbnails according to the changed sorting criteria. In this case, the control unit 130 may overlay the recommendation indicators 430 on a thumbnail corresponding to the same content according to the changed sorting criteria even if the plurality of thumbnails are rearranged and disposed.

As illustrated in FIG. 9(a), based on a first preset sorting criterion 910 (e.g., "popularity"), the plurality of thumbnails are sorted, and the recommendation indicator 430 may overlay on the thumbnail 416 corresponding to the recommended content.

As illustrated in FIG. 9(a), the recommendation indicator 430 may overlay on the thumbnails 416 corresponding to the recommended content even if the plurality of thumbnails are rearranged by changing the first set sorting criterion to a second set sorting criterion (e.g., "star rating" 920).

As described above, the method and the system for providing contents according to the present invention provide an intuitive user environment that enables users to identify at a glance information on contents that are serialized on each day of the week by collecting and providing information on contents that are serialized on the basis of a day of the week on a specific service page.

Further, the method and system for providing contents according to the present invention may provide information on popular contents to the users by providing contents that are serialized on a specific day of the week according to ranking.

Further, in the method and the system of providing contents according to the present invention, the user may be provided with information on user-customized recommended contents together with information on popular contents by overlaying a recommendation indicator on a thumbnail corresponding to a recommended content selected based on user information of a specific user account.

Further, the method and system for providing contents according to the present invention may encourage the user to use contents by recommending contents that are expected to be preferred by the user.

Further, the present invention described above may be implemented as computer-readable recording medium storing code or instructions. That is, the present invention may be provided in the form of a computer program stored on a recording medium.

A computer-readable medium may include all kinds of storage devices for storing data readable by a computer system. Examples of computer-readable media include hard disk drives (HDDs), solid state disks (SSDs), silicon disk drives (SDDs), ROMs, RAMs, CD-ROMs, magnetic tapes, floppy discs, and optical data storage devices.

Further, the computer-readable medium may be a server or cloud storage that includes storage and that the user terminal is accessible through communication. In this case, the computer may download the program according to the present invention from the server or cloud storage, through wired or wireless communication.

Further, in the present invention, the computer described above is a user terminal equipped with a processor, that is, a central processing unit (CPU), and is not particularly limited to any type.

It should be appreciated that the detailed description is interpreted as being illustrative in every sense, not restrictive. The scope of the present invention should be determined based on the reasonable interpretation of the appended claims, and all of the modifications within the equivalent scope of the present invention belong to the scope of the present invention.

As described above, the method and the system for providing contents according to the present invention provide an intuitive user environment that enables users to identify at a glance information on contents that are serialized on each day of the week by collecting and providing information on contents that are serialized on the basis of the day of the week on a specific service page.

Further, the method and the system for providing contents according to the present invention may provide information on popular contents to the users by providing contents that are serialized on a specific day of the week according to ranking.

Further, in the method and the system of providing contents according to the present invention, the user may be provided with information on user-customized recommended contents together with information on popular contents by overlaying a recommendation indicator on a thumbnail corresponding to a recommended content selected based on user information of a specific user account.

Further, the method and the system for providing contents according to the present invention may encourage the user to use contents by recommending contents that are expected to be preferred by the user.

What is claimed is:

1. A method of providing contents in a content providing service, comprising:
   receiving, from a user terminal, a request to output a specific page corresponding to a specific day of the week from among a plurality of pages distinguished on the basis of a day of the week;
   identifying a specific user account logged in to the user terminal, and identifying a recommended content that is recommended for the specific user account among a plurality of contents provided on the specific day of the week; and
   providing, to the user terminal, at least some of the plurality of contents being serialized on the specific day of the week and displaying, on a display of the user terminal, the specific page in which a plurality of thumbnails corresponding to each of the plurality of contents provided to the user terminal are listed according to predetermined sorting criteria, exclusive of content for the specific user account provided on a day of the week different from the specific day of the week,
   wherein a specific thumbnail corresponding to the recommended content among the plurality of thumbnails includes a recommendation indicator visibly indicating the specific thumbnail from among the plurality of thumbnails listed according to the predetermined sorting criteria.

2. The method of claim 1, further comprising:
   determining, as the recommended content, a content satisfying a viewing condition and a ranking condition that are predetermined among the plurality of contents provided on the specific day of the week.

3. The method of claim 2, wherein the recommended content satisfying the viewing condition is an unviewed content that has not been viewed in the specific user account among the plurality of contents serialized on the specific day of the week, or a content that has been unviewed in the specific user account less than a preset number of times.

4. The method of claim 3, wherein the ranking condition is related to popularity in a user group determined based on at least one of user's age, gender, and genre preference based on a history of contents viewed in the past, and
   wherein the recommended content is a content among the plurality of contents that is recommended for a user group to which a user of the specific user account belongs.

5. The method of claim 4, wherein, when a request to output a page for a first day of the week is received from a first user account and a second user account that are included in a first user group, among a plurality of user groups, a same or different recommended content is recommended according to a content viewing history in each of the first user account and the second user account.

6. The method of claim 5, wherein, when there is a request to output the page for the first day of the week from the first user account and the second user account and an unviewed content in each of the first user account and the second user account is different, the recommendation indicator overlays on thumbnails corresponding to the contents that are different from each other.

7. The method of claim 6, wherein, when there exists a first content that is most popular on the first day of the week and a second content that is second most popular after the first content in the first user group, a viewing history in the first user account satisfies the viewing condition for the first content and the second content, and a viewing history on the second user account does not satisfy the viewing condition for the first content, but does satisfy the viewing condition for the second content, the recommendation indicator overlays on a thumbnail corresponding to the first content on the page for the first day of the week provided to the first user account, and the recommendation indicator overlays on a thumbnail corresponding to the second content on the page for the first day of the week provided to the second user account.

8. The method of claim 4, further comprising:
determining any one of the plurality of contents, excluding contents that do not satisfy the viewing condition, as a recommended content when there is a plurality of recommended contents satisfying the recommendation condition among the plurality of contents.

9. The method of claim 1, wherein the content providing service is configured to provide the plurality of pages corresponding to each of different days of the week, and
wherein each of the plurality of pages is configured to include a thumbnail of each of the plurality of contents that are provided for the specific user account.

10. The method of claim 9, wherein, on a first page corresponding to a first day of the week among the different days of the week, a first recommendation indicator overlays on a thumbnail of a first recommended content that satisfies the viewing condition and recommendation condition for the specific user account among a plurality of contents serialized on the first day of the week,
wherein, on a second page corresponding to a second day of the week, a second recommendation indicator overlays on a thumbnail of a second recommended content that satisfies the viewing condition and recommendation condition for the specific user account among a plurality of contents serialized on the second serialized day of the week, and
wherein the first recommended content and the second recommended content are different from each other.

11. The method of claim 1, wherein the providing of the specific page to the user terminal comprises selecting at least some of the plurality of contents whose information is to be provided as the thumbnails on the specific page, based on user information according to the specific user account,
wherein the specific page is configured such that at least one of the thumbnails for a different plurality of contents is provided according to the user information, and
wherein the user information includes at least one of age, gender, and genre preference based on a history of contents viewed in the past.

12. The method of claim 1, wherein the recommendation indicator does not overlay on thumbnails corresponding to the plurality of contents serialized on the specific day of the week included in the specified page when a request to output a specific page corresponding to the specific day of the week is received from a user terminal to which a user account is not logged in.

13. The method of claim 1, wherein the recommendation indicator comprises guidance information indicating a reason the recommended content has been selected as the recommended content.

14. The method of claim 1, wherein the plurality of thumbnails included on the specific page are sequentially listed according to a popularity ranking of the plurality of contents associated with at least one of a plurality of different popularity criteria.

15. The method of claim 1, wherein, when an item corresponding to the recommended content is selected by the user terminal, the user terminal is provided with an episode page including a list of episodes of an episode constituting the recommended content.

16. A computer system for providing contents, comprising:
a communication unit configured to receive, from a user terminal, a request to output a specific page corresponding to a specific day of the week from among a plurality of pages distinguished on the basis of a day of the week; and
control unit configured to identify a specific user account logged in to the user terminal, and identify a recommended content that is recommended for the specific user account among a plurality of contents provided on the specific day of the week,
wherein the control unit provides to the user terminal at least some of the plurality of contents being serialized on the specific day of the week and displaying, on a display of the user terminal, the specific page in which a plurality of thumbnails corresponding to each of the plurality of contents provided to the user terminal are listed according to predetermined sorting criteria exclusive of content for the specific user account provided on a day of the week different from the specific day of the week, and
wherein a specific thumbnail corresponding to the recommended content among the plurality of thumbnails includes a recommendation indicator visibly indicating the specific thumbnail from among the plurality of thumbnails listed according to the predetermined sorting criteria.

17. A non-transitory computer-readable recording medium storing a computer program which, when executed by one or more processors, causes the processors to perform the steps comprising:
receiving, from a user terminal, a request to output a specific page corresponding to a specific day of the week from among a plurality of pages distinguished on the basis of a serialized day of the week;
identifying a specific user account logged in to the user terminal, and identifying a recommended content that is recommended for the specific user account among a plurality of contents provided on the specific day of the week; and
providing, to the user terminal, at least some of the plurality of contents being serialized on the specific day of the week and displaying, on a display of the user terminal, the specific page in which a plurality of thumbnails corresponding to each of the plurality of contents provided to the user terminal are listed according to predetermined sorting criteria, exclusive of content for the specific user account provided on a day of the week different from the specific day of the week,
wherein a specific thumbnail corresponding to the recommended content among the plurality of thumbnails includes a recommendation indicator visibly indicating the specific thumbnail from among the plurality of thumbnails listed according to the predetermined sorting criteria.

* * * * *